May 12, 1970  R. O. MANSPEAKER ET AL  3,511,024
MACHINE FOR WRAPPING ARTICLES
Filed Feb. 5, 1968  2 Sheets-Sheet 2

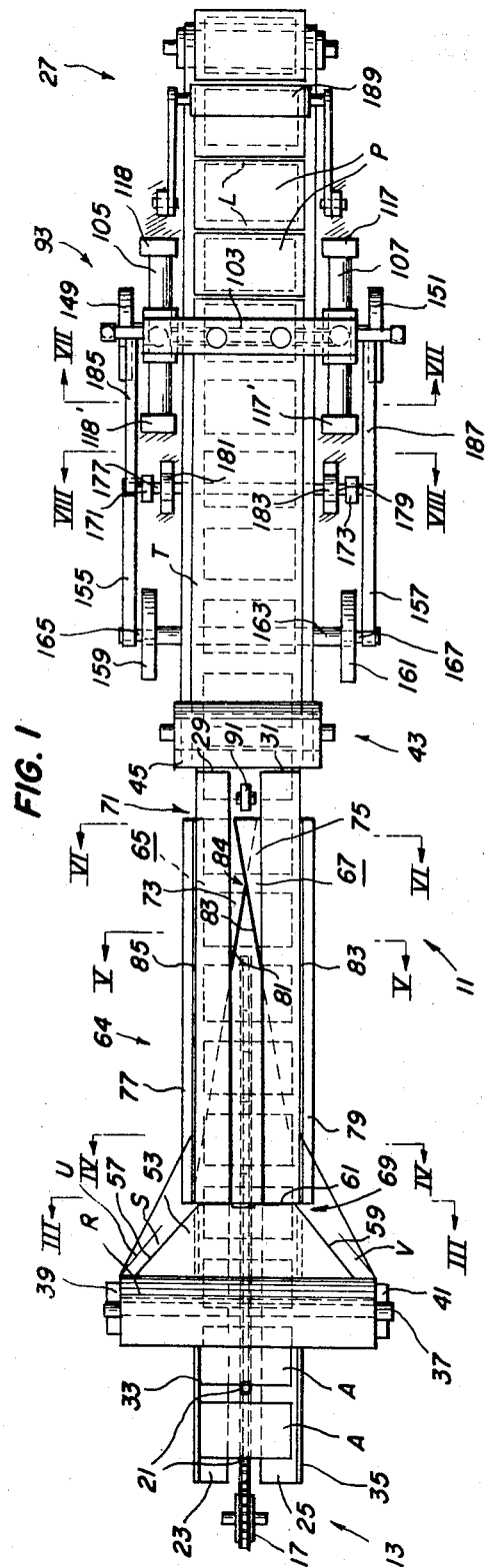
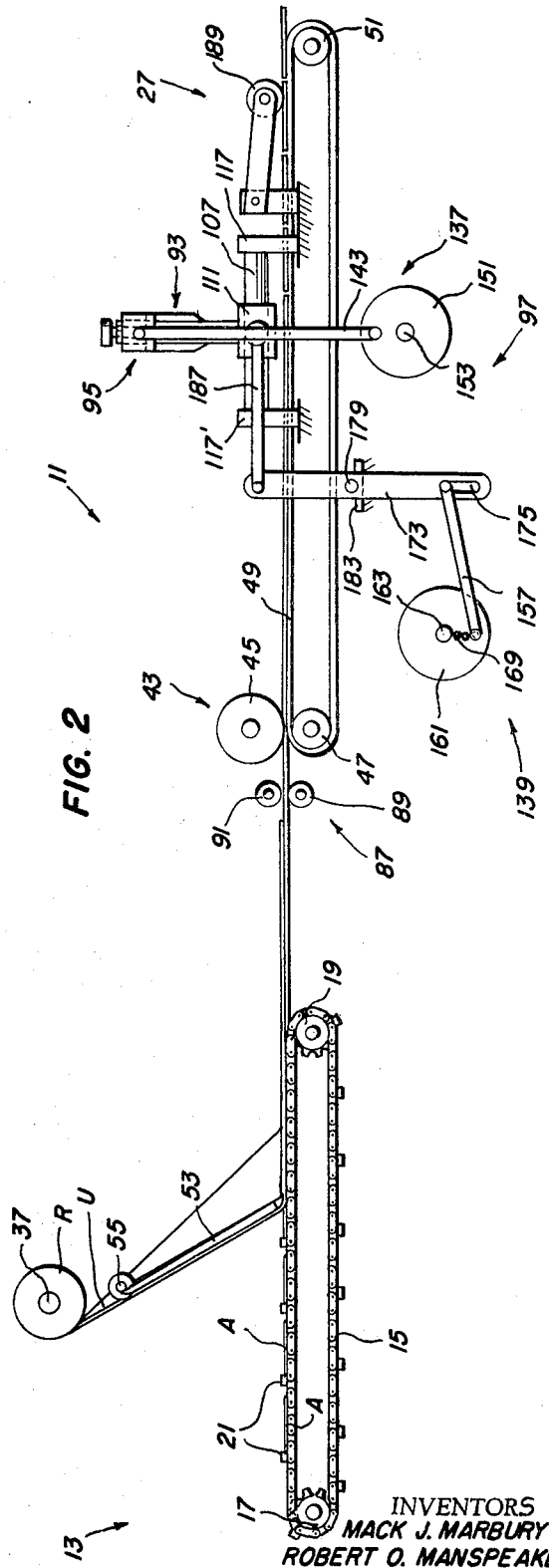

INVENTORS
MACK J. MARBURY
ROBERT O. MANSPEAKER
BY John R. Walker, III
Attorney

United States Patent Office 3,511,024
Patented May 12, 1970

3,511,024
MACHINE FOR WRAPPING ARTICLES
Robert O. Manspeaker and Mack J. Marbury, Memphis, Tenn.; said Manspeaker assignor to said Marbury, doing business as Marbury's Machine Works, Memphis, Tenn.
Filed Feb. 5, 1968, Ser. No. 707,009
Int. Cl. B65b 9/06
U.S. Cl. 53—182     11 Claims

ABSTRACT OF THE DISCLOSURE

Machine for wrapping articles with wrapping material which includes rollers for pulling a continuous strip of the wrapping material from a roll thereof through the machine from adjacent the feed or entrance end thereof towards the discharge end. A forming mechanism is provided in the machine which engages the continuous strip to form the continuous strip into a continuous tube of material independent of the articles to be wrapped. A continuous conveyor provided with lugs, between which the articles to be wrapped are placed, feeds the articles into the tube of material. A sealing and cutting mechanism is provided which transversely seals and severs the tube in the spaces between the articles to form individually wrapped articles. Means is provided for causing the heated portion of the sealing means and the blade of the cutting means to move substantially linearly with the tube of material while the tube is being sealed and cut.

BACKGROUND OF THE INVENTION

(1) Field of the invention

The invention pertains to a machine for wrapping articles with wrapping material.

(2) Description of the prior art

Various machines have heretofore been provided that package or wrap articles with a continuous sheet of material, which are then severed and sealed to form individual packages. Such a machine, for example, is shown in Pat. No. 2,894,362. Some of the problems in prior machines have involved the jamming of the machine when the articles to be packaged or wrapped are missing. Also, there have been problems in the cutting and sealing of the wrapping material between the articles.

SUMMARY OF THE INVENTION

The present invention provides a machine for wrapping articles in which an improved wrapping mechanism is provided that includes a pair of horizontal plates having the inner edges thereof angularly disposed for engaging the sheet of material to cause overlapping thereof below the articles, and independent of the articles so that if any of the articles are missing the machine will not become jammed but will continue to pull the tube of wrapping material through the machine.

Another feature of the invention is the cutting and sealing mechanism, which is not mounted on a rotating device as many of the prior art mechanisms are, but instead is driven by a unique carrying and driving mechanism so that the heated portion of the sealing mechanism and the blade of the cutting mechanism move substantially linearly at the same speed with the tube of material while the tube is being sealed and cut thereby. Thus, there is no tendency for tearing or balling up of the wrapping material and the cutting and sealing can be accomplished more effectively.

DESCRIPTION OF THE DRAWINGS

FIG. 1 is a somewhat schematic top plan view of the machine of the present invention.

FIG. 2 is a somewhat schematic side view thereof.

DESCRIPTION OF THE PREFERRED EMBODIMENT

Figure 3:
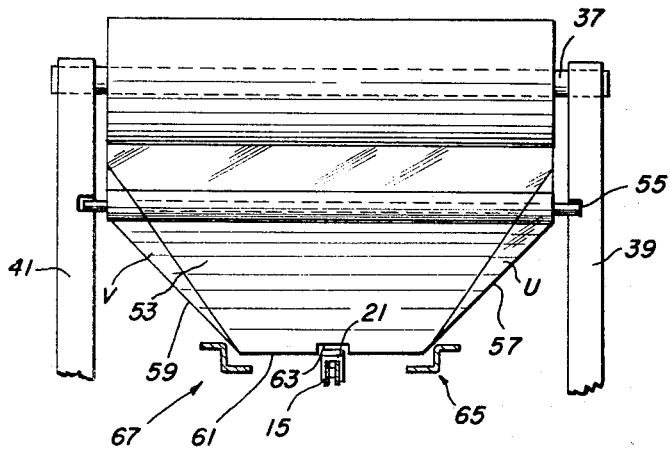
FIGS. 3–6 are enlarged sectional views shown somewhat schematically and taken as on the lines III—III, IV—IV, V—V, and VI—VI, respectively, of FIG. 1.

Referring now to the drawings, the machine 11 of the present invention is provided adjacent the entrance end 13 thereof with a continuous chain conveyor 15 which extends over sprockets 17, 19 and is driven by suitable means in a clockwise direction as viewed in FIG. 2. The conveyor 15 is provided with a plurality of lugs 21 spaced along the length thereof. The articles to be wrapped which are illustrated as greeting cards A are loaded onto the machine 11 adjacent the entrance end 13 on the top flight of conveyor 15 respectively between adjacent pairs of lugs 21, as best seen in FIGS. 1 and 2. The cards slidably rest on substantially horizontal upper plate means in the form of a pair of spaced apart horizontal upper plates 23, 25 which extend from adjacent the entrance end 13 of the machine towards the discharge or exit end 27 thereof for a substantial distance therealong and terminate respectively at the ends thereof 29, 31. For a distance adjacent the entrance end 13 the plates 23, 25 are provided with upturned lips 33, 35 along the opposite side edges thereof. The upper plates 23, 25 are preferably disposed relative to the conveyor 15 in such a manner that the upper surfaces of the plates extend above the conveyor and the lugs 21 extend above the upper surface of the plates so that the rearward one of the pair of lugs 21 between which an article is placed will push the article A slidably along the upper surfaces of the upper plates 23, 25.

A roll R of the wrapping material, which is any suitable sheet material as cellophane, clear plastic or the like is disposed in spaced relationship above chain conveyor 15 and is mounted for rotation about a horizontal axis as by means of the shaft 37 extending through the center thereof and with the shaft being supported at the opposite ends thereof by the standards 39, 41. A continuous strip S of the wrapping material, which is wound into the roll R, is pulled from the roll by suitable pulling mechanism 43. The pulling mechanism 43 includes an upper resilient roller 45. A lower roller 47 about which a continuous conveyor belt 49 extends, is disposed below upper roller 45. The strip S of material thus extends between upper roller 45 and conveyor belt 49 with roller 47 therebelow so that the strip S is pulled towards the exit end 27 of the machine and to the right as viewed in FIGS. 1 and 2. Conveyor belt 49 adjacent the exit end 27 extends over a roller 51. If desired, either or both of rollers 47, 51 may be driven, and the roller 45 is preferably an idler roller.

When the strip S is moved along the machine 11 as heretofore described, the strip is formed into a continuous tube T of the material as will be hereinafter described. It will be noted hereinbelow that actually by the time that the strip S gets to the pulling mechanism 43 it has already been formed into the tube T.

A guide means in the form of a substantially trapezoidally shaped plate-like guide member 53 is hingedly mounted adjacent the upper edge thereof by suitable means as the horizontal pin 55 supported adjacent the opposite ends thereof by the standards 39, 41 below the roll R. The opposite side edges 57, 59 of guide member 53 from the upper edge of the guide member extend downwardly and converge inwardly to the lower horizontal edge 61 of the guide member. Guide member 53 rests against the top surface of strip S to hold it downwardly. Opposite sides U, V of strip S slidably engage side edges 57, 59 which causes them to be disposed angularly. The middle portion M of strip S slidably engages lower edge 61, which causes the middle portion to be held horizontally adjacent the top of articles A and upper plates 23, 25. Guide member 53 is notched as at 63 along the lower edge 61 thereof to accommodate the lugs 21.

Figure 6:
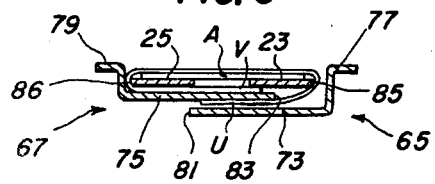

A forming means or mechanism 64 is provided which is preferably constructed in the following manner:

A pair of lower guide members 65, 67 extend from the entrance end 69 thereof, which is adjacent the lower edge 61, horizontally to the exit end shown as at 71. Lower guide members 65, 67 respectively include horizontal plates 73, 75 and upstanding angular members 77, 79 preferably integrally attached along the opposite side edges of the plates 73, 75. The horizontal plates 73, 75 are respectively provided with angularly arranged inner edges 81, 83 for engaging the strip S to cause overlapping thereof below the articles A. More specifically, the inner edges 81, 83, starting towards the entrance end 69 in which the inner edges are respectively adjacent angular members 77, 79, angle inwardly towards one another and thence cross in the area shown as at 84. The plates 73, 75 are supported by suitable means, not shown, below upper plates 23, 25 in spaced parallel relationship thereto. The horizontal plate 75 is supported slightly above the plate 73 so that the plates will not conflict when they cross and so that the horizontal plate 73 will be in overlapping spaced relationship below plate 75 after the plates have crossed, as shown in FIG. 6. In other words, the widths of the horizontal plates 73, 75 are progressively greater from adjacent entrance end 69 towards exit end 71.

Figure 4:
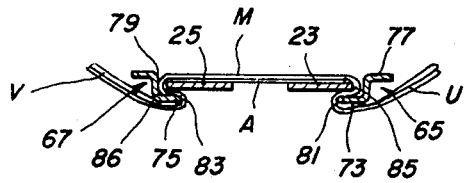
Figure 5:
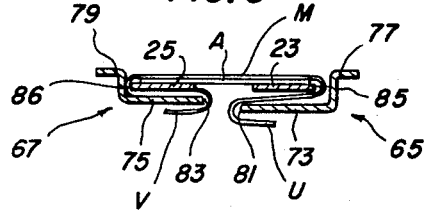

The strip S of material extends or is fed into entrance end 69 with the middle portion M thereof extending over upper plates 23, 25 and with the opposite sides U and V of the strip S extending down and around the opposite side edges 85, 86 of plates 23, 25 and thence extend inwardly and around the inner edges 81, 83 as best seen in FIG. 4. As the strip S is moved along, the sides U and V are moved inwardly towards one another by the inner edges 81, 83 as best seen in FIG. 5 and then they are overlapped as shown in FIG. 6.

It will be understood that as the strip S is being formed into the tube T with overlapping side portions U, V the articles A are being enclosed by the strip S, but it should be pointed out that this forming of the tube T is entirely independent of the articles A and if any of the articles are skipped or not fed into the machine, then the tube T will continue to be formed and there will be no jamming thereof. In other words, the strip S does not use the article as a means for forming the strip around the article.

Also, it will be understood that the articles A, after the termination of conveyor 15, will be carried along by the strip S, which by that time has almost completed enclosure of the article.

After the tube T with the articles A therein passes out from the exit end 71 a sealing mechanism 87 of suitable construction is provided for engaging the tube T to seal the overlapped sides U, V thereof. Sealing mechanism 87 is preferably of a well-known heat-sealing type and is shown somewhat schematically in FIGS. 1 and 2 as a heated roller 89 which is heated by suitable heating means not shown and which engages the lower part of the tube T in the middle thereof at the overlapped sides U, V. An idler roller 91 is preferably disposed above roller 89 and engages the top of tube T to act as a backup means for the heated roller 89. It will be understood that the sealing mechanism 87 forms a continuous sealed seam along the bottom of the tube adjacent the mid-portion thereof which extends continuously to seal the tube T. If desired, sealing mechanism 87 may be omitted without departing from the spirit and scope of the present invention.

Next, after passing from sealing mechanism 87, the sealed tube T passes between rollers 45, 47 and onto the conveyor belt 49.

Next, the tube T passes through a sealing and cutting mechanism 93 having an associated mounting means 95 and drive mechanism 97, all of which is described hereinafter:

Mounting means 95 includes a pair of vertical members 99, 101 interconnected by a carrier 102 that includes a transverse member 103 which is vertically slidable on the vertical members, with the vertical members extending through vertical bores in the transverse member. Vertical members 99, 101 are slidably mounted adjacent the lower ends thereof from horizontal rods 105, 107 by suitable means as the block-like members 109, 111 respectively attached to the lower ends of the vertical members 99, 101 and which are respectively provided with bores 113, 115 through which the horizontal rods 105, 107 respectively extend. Horizontal rods 105, 107 are fixedly supported on opposite sides of conveyor belt 49 by suitable means as the supports 117, 117', 118, 118' at the opposite ends of the horizontal rods. The horizontal rods 105, 107 are arranged in substantially parallel relationship with conveyor belt 49 so that movement of mounting means 95 on horizontal rods 105, 107 is effective to move the mounting means parallel with the conveyor belt 49 and the mounting means is adapted to be reciprocatingly moved forward and rearward relative to the conveyor belt by means to be described later in the specification.

Sealing and cutting mechanism 93 includes a block-like body portion 119 which is tapered adjacent the lower part thereof to a relatively narrow substantially horizontal knife edge 121 extending transversely relative to belt 49. A pair of resilient rubber pressure pads 122, 122' are fixedly attached by suitable means, as screws 123, to the forward and rearward faces of body portion 119 adjacent the lower portion thereof. The pads 122, 122' preferably extend across the entire width of body portion 119. The pads 122, 122' normally extend below edge 121 when out of contact with tube T. Body portion 119, pads 122, 122' and edge 121 are heated by suitable means as the electrical heating element 125 of known construction that is connected by the wires 127 to a suitable source of electricity and suitable well known control means such as thermostats and heat adjusting means, not shown.

Figure 9:
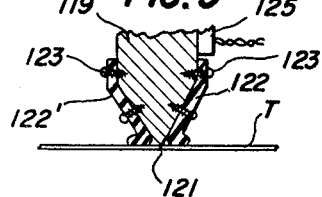
FIG. 9 is a fragmentary enlarged view taken as on a vertical plane through the lower part of the sealing and cutting means, and with the vertical plane extending parallel with the travel of conveyor belt 49.
Figure 7:
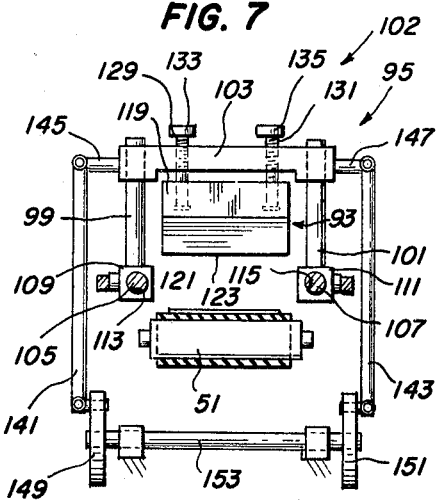
FIGS. 7 and 8 are sectional views shown somewhat schematically and taken as on the lines VII—VII and VIII—VIII, respectively of FIG. 1.
Figure 8:
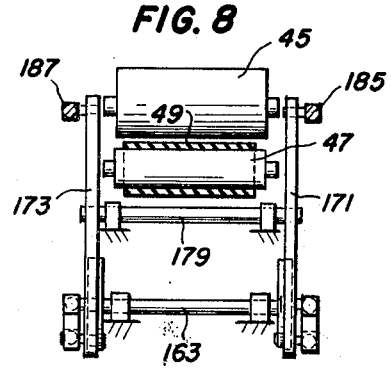

Body portion 119 is adjustably mounted from transverse member 103 by suitable means as the threaded elements 129, 131 that are rotatably engaged adjacent the lower ends thereof in sockets provided in body portion 119 and extend upwardly through threaded bores in transverse member 103 and therethrough where they terminate in knobs 133, 135. For purposes of clarity, it should be pointed out that threaded elements 129, 131, in addition to transverse member 103, are a part of carrier 102. From the foregoing it will be understood that upward and downward vertical movement of carrier 102 carries the body portion 119, edge 121, and pads 122, 122' upwardly and downwardly so that in the downward position the pads 122, 122' are adapted to contact tube T first to hold the tube and simultaneously seal the tube along transverse edges as at L. This is followed by the knife edge 121 cutting and also aiding in sealing tube T. It will be understood that during the cutting of tube T by knife edge 121 the pads 122, 122' will be compressed as shown in FIG. 9. This holding action of pads 122, 122' insures that the wrapping material is held in place during cutting and that sufficient time is allowed for sealing. After this sealing and cutting operation individual packaged articles P are provided.

One of the important features of the present invention is the drive mechanism 97 which, as opposed to previous sealing and cutting means that were carried on a rotating member, causes the edge 121 and pads 122, 122' to be moved along linearly at the same speed with the tube T for a substantial distance during the cutting and sealing thereof above described. This drive mechanism 97 is described as follows:

Drive mechanism 97 is divided into two parts, namely a first drive mechanism 137 for causing vertical reciprocation of carrier 102, body portion 119 and its related parts, and a second drive mechanism 139 for causing forward and rearward horizontal reciprocation of mounting means 95, carrier 102, body portion 119 and its related parts.

First drive mechanism 137 comprises pitman rods 141, 143 pivotally connected adjacent the upper ends thereof to transverse member 103 by the outwardly extending pins 145, 147 and are respectively pivotally connected adjacent the lower ends thereof to driving wheels 149, 151 which in turn are fixed on the shaft 153 which is rotatably driven in a counterclockwise direction as viewed in FIG. 2 by suitable means, not shown, so that as the driving wheels are rotated carrier 102 will move upwardly and downwardly.

Second drive mechanism 139 includes a pair of pitman rods 155, 157 pivotally attached adjacent one of the ends thereof respectively to driving wheels 159, 161. Driving wheels 159, 161 are fixed to a shaft 163 which is rotatably driven by suitable means at the same speed as the rotation of shaft 153, but in the opposite direction, or clockwise as viewed in FIG. 2. The attachment between pitman rods 155, 157 and driving wheels 159, 161 is preferably by pins 165, 167 which are selectively fittable in a selected one of the apertures 169 in driving wheels 159, 161 (only the apertures 169 are shown in wheel 161). The opposite ends of pitman rods 155, 157 are adjustably pivotally mounted on the lower ends of levers 171, 173. The levers 171, 173 are each provided with a slot 175 (only the one in lever 171 is shown) to permit the above-mentioned adjustment to vary the effective length of the lever arms. Levers 171, 173 are pivotally mounted adjacent the midportions thereof as by the stud shafts 177, 179 that are journalled in bearings 181, 183 which in turn are supported from suitable support structure. The upper ends of levers 171, 173 are pivotally attached to connecting rods 185, 187 which in turn are respectively pivotally attached adjacent the opposite ends thereof to block-like members 109, 111. From the foregoing it will be understood that rotation of driving wheels 159, 161 will cause the mounting means 95 to reciprocate forwardly and rearwardly or back and forth along conveyor belt 49 and that simultaneous rotation of driving wheels 149, 151 will cause carrier 102 and the associated parts to move upwardly and downwardly. The action is such that the edge 121 and pads 122, 122' will move downwardly into contact with the tube T for the sealing and cutting thereof during this time of engagement with the tube T. The edge 121 and pads 122, 122' will move substantially at the same speed as the tube T and substantially linearly therewith whereby there is no tendency to pull or tear the tube but rather a clean cut and seal is provided. It will be understood that the pitman rods 155, 157 may be adjusted in the slots 175 and/or put in selected apertures 169 to vary the path of travel of the knife edge 121 and pads 122, 122'. Also, the relationship of the driving wheels 149, 151, 159, 161 may be changed relative to conveyor 15 to give different effects as to the position of sealing and cutting.

After passing from sealing and cutting mechanism 93, the packaged article is then complete so that the output of the machine is a plurality of individually packaged articles P in packages in which the forward and rearward edges L are sealed as well as the seal heretofore-described along the middle of the tube T in the overlapped portions of the strip S. An idler roller 189 is preferably provided to hold down the individual packages P on the belt 49.

Although the preferred embodiment of the present invention has been described, it will be understood that various modifications in the disclosed structure may be made without departing from the spirit of the invention as defined in the claims.

We claim:

1. A machine for wrapping articles with wrapping material comprising means for moving a continuous strip of the wrapping material through said machine from the entrance end thereof towards the discharge end thereof, forming means engaging the strip of material to form the strip into a continuous tube of material independent of the articles to be wrapped, feed means for feeding the articles in spaced relationship to each other into the continuous tube of material, and sealing and cutting means including a heated portion for transversely sealing and severing the tube in the spaces between the articles to form individually wrapped articles, and carrying and drive means for causing said heated portion and said blade to move linearly and horizontally with the tube of material while the tube is being cut and sealed thereby.

2. A machine for wrapping articles with wrapping material comprising means for moving a continuous strip of the wrapping material through said machine from the entrance end thereof towards the discharge end thereof, forming means engaging the strip of material to form the strip into a continuous tube of material independent of the articles to be wrapped, feed means for feeding the articles in spaced relationship to each other into the continuous tube of material, and sealing and cutting means including a heated portion for transversely sealing and severing the tube in the spaces between the articles to form individually wrapped articles, and carrying and drive means for causing said heated portion and said blade to move substantially linearly with the tube of material while the tube is being cut and sealed thereby; said forming means comprising substantially horizontal upper plate means on which the articles are adapted to slidably rest, a pair of lower guide means respectively including horizontal plates spaced below said upper plate means, said upper plate means including substantially parallel outer edges for engaging the opposite side edges of the sheet during the forming thereof into a tube, and said horizontal plates including angularly arranged inner edges for engaging the sheet to cause overlapping thereof below the articles.

3. The machine of claim 1 in which said heated portion includes a knife edge and resilient pad means normally extending downwardly below said knife edge.

4. The machine of claim 2 in which the inner edges of said horizontal plates cross one another and the width of each of said horizontal plates progressively is greater from adjacent the entrance end of the machine towards the discharge end thereof.

5. The machine of claim 4 which includes a substantially trapezoidally shaped plate-like guide means hingedly mounted adjacent the upper end thereof and is adapted to engage the top of the strip of material adjacent the lower end thereof for aiding in guiding the strip of material into said forming means.

6. The machine of claim 1 in which said carrying and drive means comprises a carrier supporting said heating and sealing means, means mounting said carrier for linear reciprocating horizontal movement of said heating and sealing means parallel with the path of movement of the tube of material between forward and rearward positions, and for vertical movement between a lowered position for engagement of said heated portion and said blade with the tube of material and raised positions out of engagement with the tube of material, first drive means connected to said carrier for causing the vertical movement thereof, and second drive means connected to said means mounting said carrier for causing the reciprocating forward and rearward movement thereof and for causing said heated portion and said blade to move along with the tube of material at the same speed while in contact therewith.

7. The machine of claim 4 in which said feed means comprises a continuous conveyor chain and spaced lugs thereon with said conveyor chain extending from a place adjacent the entrance end of said machine to a place adjacent where the inner edges of said horizontal plates cross one another.

8. The machine of claim 7 which includes sealing means for engaging the tube of material to seal the overlapped side edges thereof.

9. A machine having feed and discharge ends, said machine being adapted to wrap articles with wrapping material, comprising a holder for a roll of the wrapping material, roller means for engaging and pulling a continuous strip of the material from the roll of material towards the discharge end of said machine, forming means engaging the strip of material between said holder and said roller means to form the strip into a continuous tube of material independent of the articles to be wrapped, a substantially trapezoidally shaped plate-like guide means hingedly mounted adjacent the wider upper end thereof at a level below the roll of material with the lower end thereof being adapted to restingly and slidingly engage the upper surface of the strip of material to aid in guiding the strip of material into said forming means; said forming means including substantially horizontal upper plate means on which the articles are adapted to slidably rest, a pair of lower guide means respectively including horizontal plates spaced below said upper plate means, said upper plate means including substantially parallel outer edges for engaging the opposite side edges of the sheet during the forming thereof into a tube, said horizontal plates including angularly arranged inner edges for engaging the sheet to cause overlapping thereof below the articles, said inner edges of said horizontal plates crossing one another and the width of each of said horizontal plates progressively being greater from the entrance end of the machine towards the discharge end thereof, feed means for feeding the articles in spaced relationship to each other into the continuous tube of material, said feed means including a continuous conveyor chain and spaced lugs thereon with said conveyor chain extending from a place adjacent the entrance end of said machine to a place adjacent where said horizontal plates cross one another, and sealing and cutting means including a heated portion for transversely sealing and severing the tube in the spaces between the articles to form individually wrapped articles, and carrying and drive means for causing said heated portion to move substantially linearly with the tube of material while the tube is being sealed and cut thereby.

10. The machine of claim 9 in which said carrying and drive means comprises a means mounting said carrier for linear reciprocating movement parallel with the path of movement of the tube of material between forward and rearward positions.

11. The machine of claim 10 which includes sealing means for engaging the tube of material to seal the overlapped side edges thereof.

References Cited

UNITED STATES PATENTS

| | | | |
|---|---|---|---|
| 2,951,325 | 9/1960 | Podlesak et al. | 53—182 |
| 3,090,174 | 5/1963 | Kraft | 53—182 X |
| 3,283,470 | 11/1966 | Oelze et al. | 53—182 X |

TRAVIS S. McGEHEE, Primary Examiner